(12) United States Patent
Smith et al.

(10) Patent No.: US 9,264,571 B2
(45) Date of Patent: Feb. 16, 2016

(54) BIASED DOCUMENT BACKING

(75) Inventors: Ryan M. Smith, San Diego, CA (US);
Gustaf L. Belt, San Diego, CA (US);
Kevin L. Bokelman, San Diego, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 2879 days.

(21) Appl. No.: 11/669,143

(22) Filed: Jan. 30, 2007

(65) Prior Publication Data

US 2008/0180757 A1 Jul. 31, 2008

(51) Int. Cl.
*H04N 1/10* (2006.01)

(52) U.S. Cl.
CPC .......... *H04N 1/10* (2013.01); *H04N 2201/0422* (2013.01)

(58) Field of Classification Search
CPC ........................................................ H04N 1/10
USPC ..................................................... 358/488, 496
See application file for complete search history.

(56) References Cited

U.S. PATENT DOCUMENTS

| | | | |
|---|---|---|---|
| 4,257,587 A | 3/1981 | Smith | |
| 4,359,219 A | 11/1982 | Garavuso | |
| 6,320,650 B1 | 11/2001 | Fredlund et al. | |
| 6,791,724 B2 * | 9/2004 | Khovaylo et al. | 358/497 |
| 6,957,037 B2 | 10/2005 | Terae et al. | |
| 7,050,206 B2 | 5/2006 | Payne et al. | |
| 7,382,500 B2 * | 6/2008 | Payne | H04N 1/00702 271/186 |
| 7,466,462 B2 * | 12/2008 | Chen | 358/497 |
| 2003/0038227 A1 * | 2/2003 | Sesek et al. | 250/208.1 |
| 2006/0256391 A1 * | 11/2006 | Eom et al. | 358/305 |
| 2007/0109612 A1 * | 5/2007 | Sakakibara et al. | 358/486 |

* cited by examiner

*Primary Examiner* — Marcellus Augustin
(74) *Attorney, Agent, or Firm* — Rathe Lindenbaum LLP

(57) ABSTRACT

A document backing extending in a plane is resiliently biased in a direction substantially parallel to the plane.

30 Claims, 7 Drawing Sheets

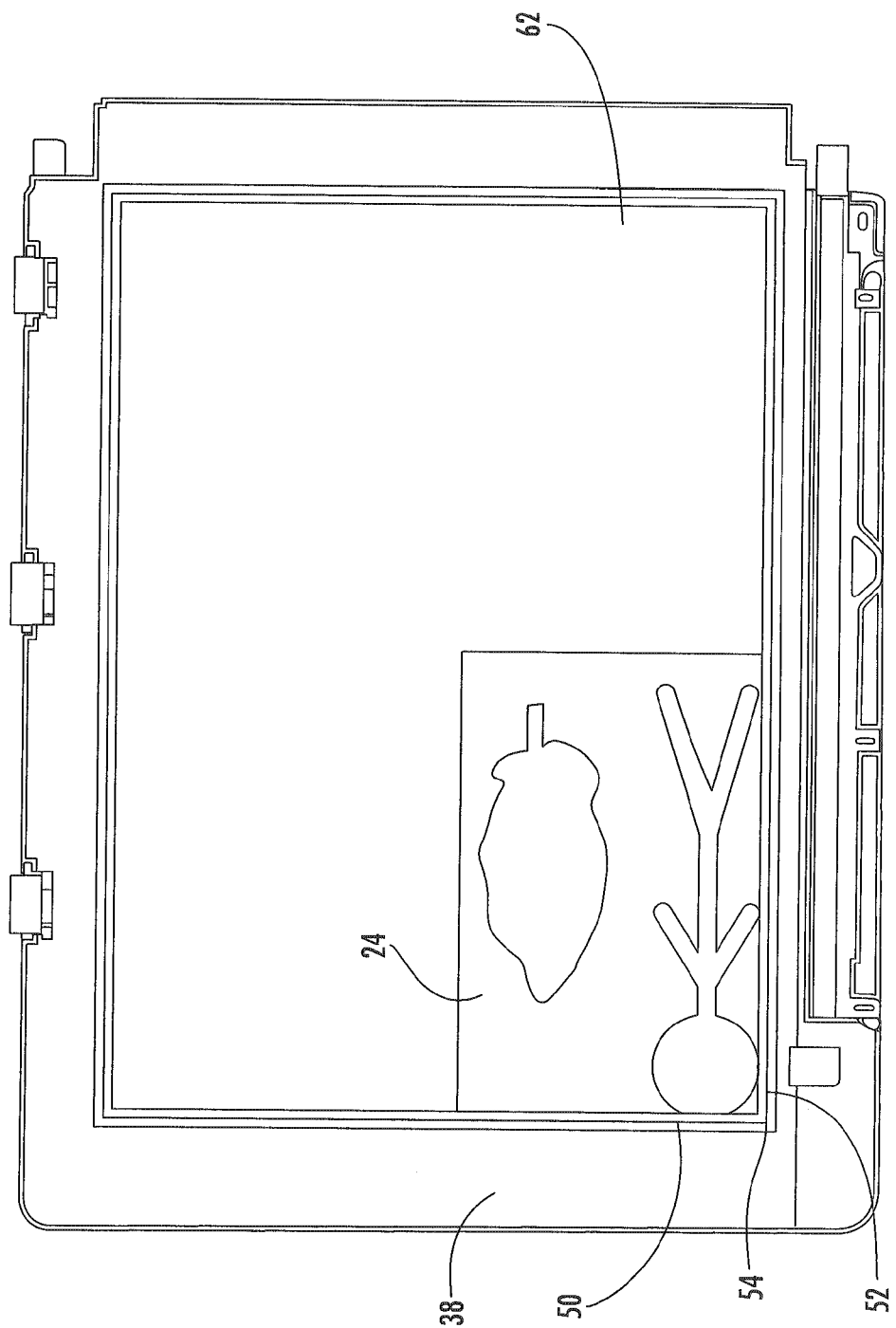

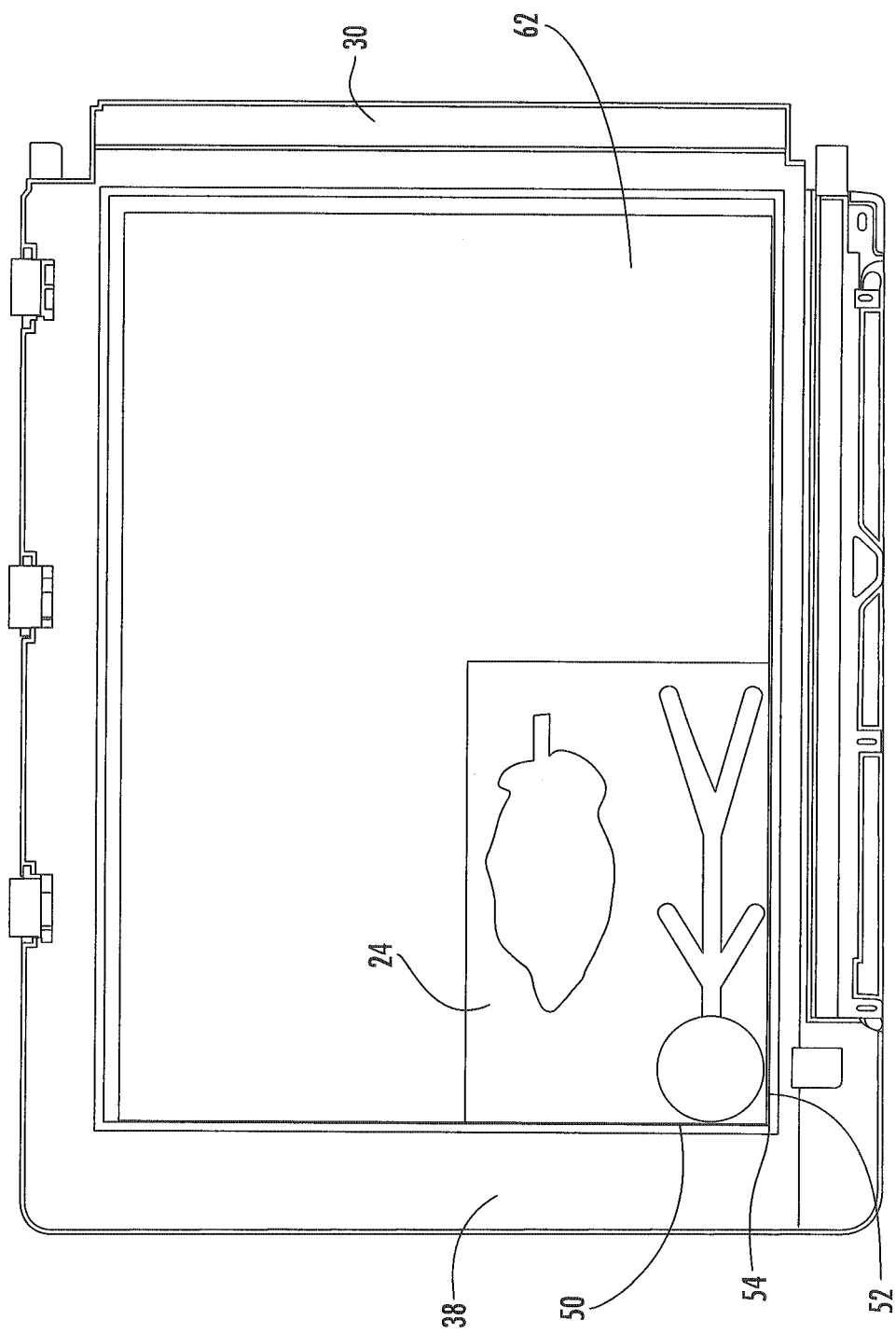

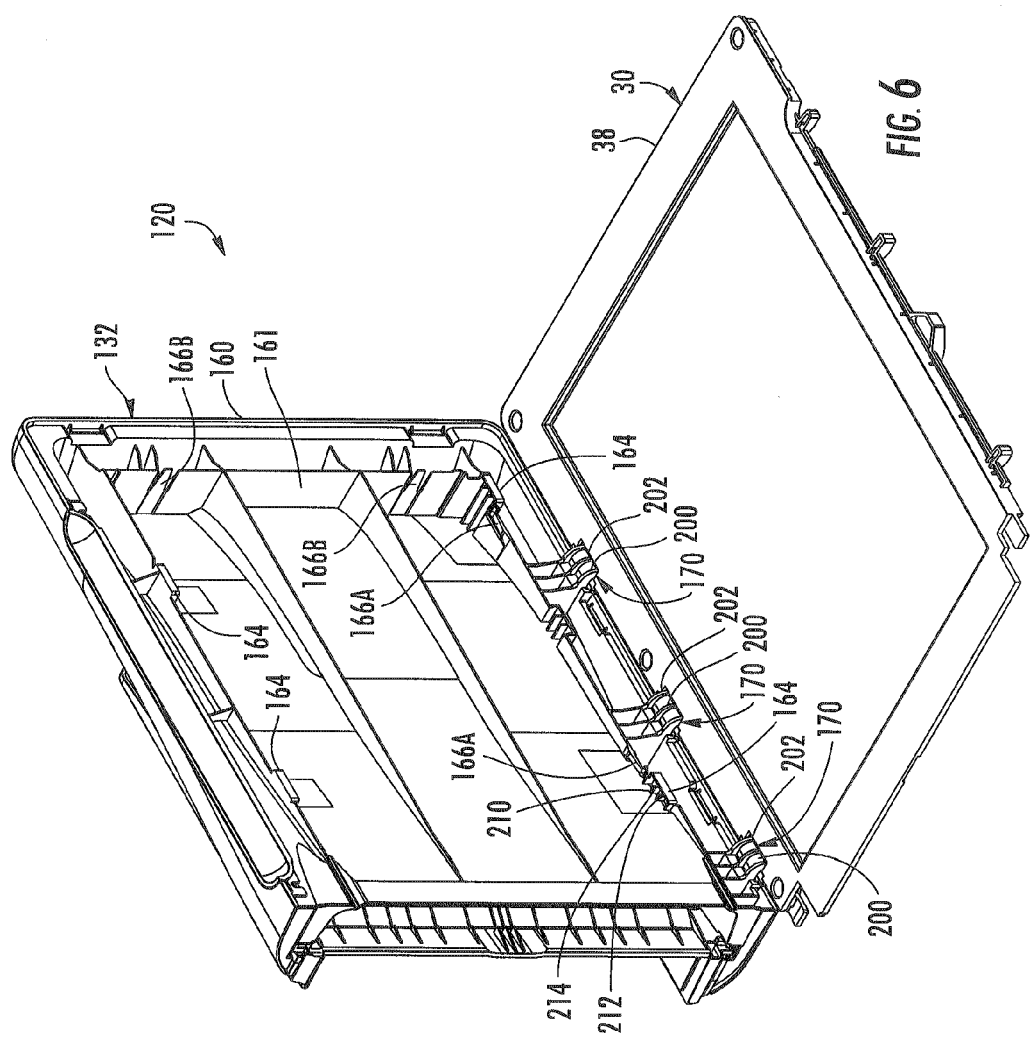

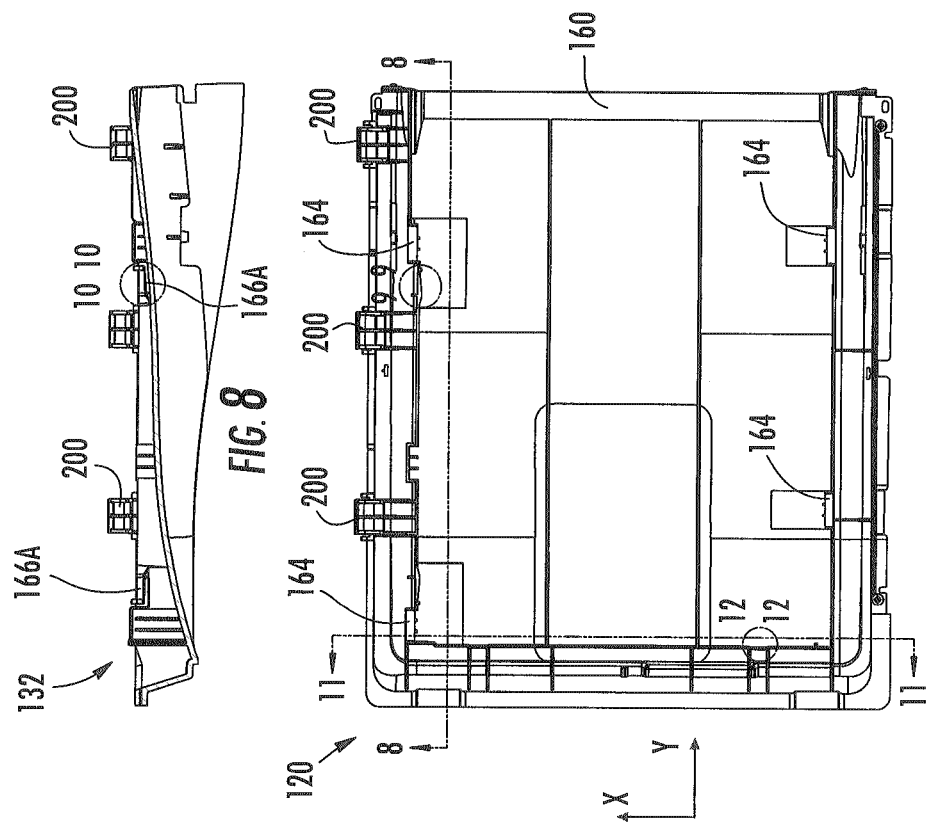

… … …

BIASED DOCUMENT BACKING

BACKGROUND

Flatbed image captures sometimes include a document backing. The electronic images of scanned documents are cropped to account for positioning tolerances associated with the document backing. As a result, portions of the document being scanned may sometimes be undesirably missing from the scanned and cropped electronic image.

BRIEF DESCRIPTION OF THE DRAWINGS

FIG. 4 is a bottom plan view of an image capture bed illustrating captured information from the document according to a second scenario.

FIG. 5 is a bottom plan view of image capture bed illustrating captured information from a document using the image capture system of FIG. 1 according to an example embodiment.

FIG. 6 is a top perspective view of another embodiment of the image capture system of FIG. 1 with portions omitted for purposes of illustration according to an example embodiment.

FIG. 7 is a bottom plan view of a lid of the image capture system of FIG. 6 with portions omitted for purposes of illustration according to an example embodiment.

FIG. 8 is a sectional view of the lid of FIG. 7 taken along line 8-8 according to an example embodiment.

FIG. 9 is an enlarged view of a portion of the lid of FIG. 7 taken along line 9-9 according to an example embodiment.

FIG. 10 is an enlarged fragmentary sectional view of a portion of the lid of FIG. 8 taken along line 10-10 according to an example embodiment.

FIG. 11 is a sectional view of the lid of FIG. 7 taken along line 11-11 according to an example embodiment.

FIG. 12 is an enlarged fragmentary view of the lid of FIG. 7 taken along line 12-12 according to an example embodiment.

FIG. 13 is an enlarged fragmentary side elevation view of a portion of the lid of FIG. 11 taken along line 13-13 according to an example embodiment.

DETAILED DESCRIPTION OF THE EXAMPLE EMBODIMENTS

Figure 1:
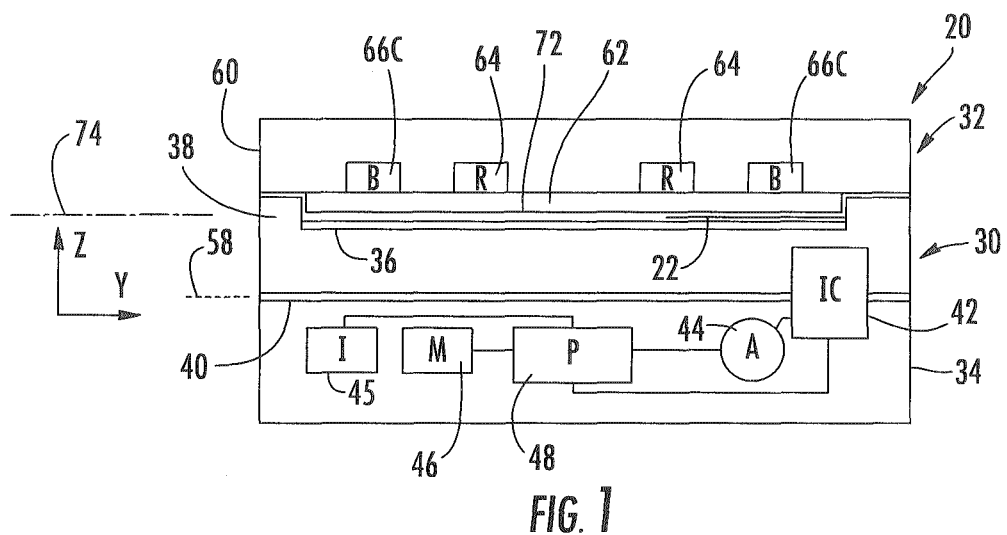
FIG. 1 is a sectional view schematically illustrating an image capture system in a closed state according to an example embodiment.
Figure 2:
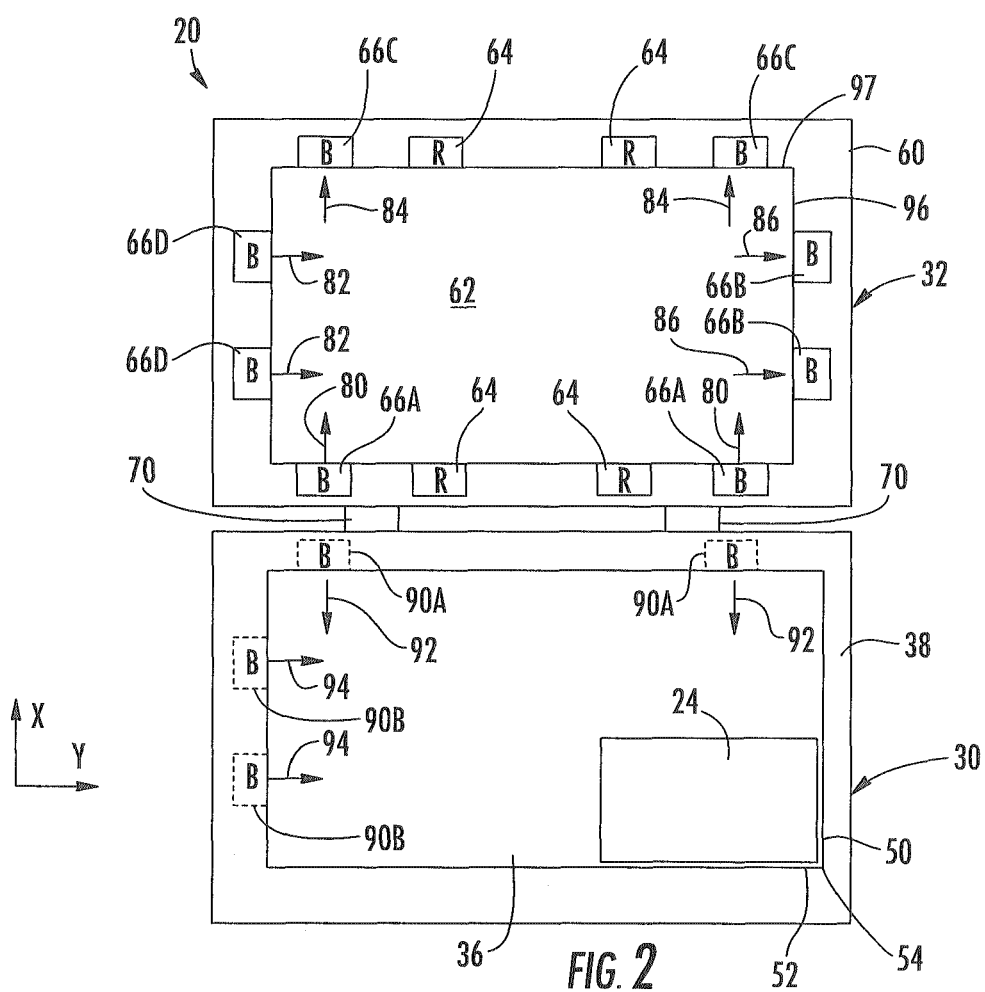
FIG. 2 is a top plan view all of the image capture system of FIG. 1 in an open state according to an example embodiment.

FIGS. 1 and 2 schematically illustrate image capture system 20 according to one example embodiment. FIG. 1 is a sectional view of image capture system 20 in a closed state. FIG. 2 illustrates image capture system 20 in an open and document receiving state. Image capture system 20 is configured to scan or capture information (an image) upon a face 22 of a document 24. As will be described in more detail hereafter, image capture system 20 is configured to form an electronic image of document 24 which includes more information from document 24 and less extraneous information not originating with document 24.

Image capture system 20 includes image capture bed 30 and lid 32. Image capture bed 30 contains image capture components and is configured to support document 24. Image capture bed 30 includes housing 34, platen 36, platen frame 38, guide 40, image capture component 42, actuator 44, command interface 45, memory 46 and processor 48. Housing 34 comprises one or more structures configured to support and enclose components of image capture bed 30. Housing 34 may have a variety of sizes, shapes and configurations.

Platen 36 comprises a structure, such as a plate or panel supported by housing 34 and configured to support document 24 as light, such as visible light, is transmitted through platen 36. Platen 36 serves as a window through which images or information from document 24 are captured. Platen 36 is formed from a transparent material, such as glass or a transparent polymer. In the particular embodiment illustrated, platen 36 provides a generally horizontal bias upon which document 24 may rest as it is being scanned. In other embodiments, platen 36 may alternatively be supported by housing 34 in a vertical or inclined orientation.

Platen frame 38 comprises a bezel structure supported by housing 34 and projecting above the platen 36 adjacent to platen 36. Platen frame 38 is configured to indicate to a person proper placement of a document upon platen 36. In particular, platen frame 38 forms a pair of raised surfaces 50, 52 which extend substantially perpendicular to one another so as to form an origin corner 54 adjacent to platen 36 against which a corner of a document to be scanned may be positioned for image capture.

In the particular example illustrated, platen frame 38 continuously extends about and surrounds platen 36 and projects above platen 36 to mate with lid 32 so as to inhibit entry of stray or environmental light onto platen 36. In other embodiments, platen frame 38 may alternatively extend just in corner 54 rather than entirely about platen 36. In still other embodiments, platen frame 38 may include a plurality of spaced projecting tabs or other surfaces extending about platen 36 at selected locations about platen 36. Although platen frame 38 is illustrated as being generally rectangular, in other embodiments, platen frame 38 may be square or other shapes.

Guide 40 comprises one or more structures configured to guide movement of image capture component 42 along an axis 58 relative to platen 36. In one embodiment, guide 40 comprises and elongate substantially rigid rod supported by housing 34, wherein image capture component 42 slides along the rod. In another embodiment, guide 40 may comprise one of a grooved or channel and a projection, wherein image capture component 42 includes the other of the channel in the projection, facilitating sliding of image capture component 42 along guide 40. In other embodiments, other structures may be employed for movably supporting image capture component 42. In other embodiments in which image capture component 42 is not moved or is stationary, guide 40 may be omitted. For example, in other embodiments, image capture component 42 may be configured to capture an image from across substantially an entirety of platen 36. In still other embodiments, image capture component may include both stationary and moving members. For example, in one embodiment, image capture component 42 may include a stationary sensor or charge coupled device, wherein image captured 142 further includes a light source and one or more optical members, such as mirrors or lenses, which move along an axis 40 and which are driven by actuator 44.

Image capture component 42 comprises a component or element configured to capture or sense images (text, graphics and the like), upon a face of a sheet of media through platen 36. In one embodiment, image capture component 42 comprises an image capture element which is moved across or along platen 36. In other embodiments, image captured 142 may be configured to concurrently capture information from substantially an entire surface area of platen 36 such that component 42 may remain stationary. In one embodiment, image capture component 42 emits light towards platen 36 and senses light reflected from the face of the sheet of media through platen 36, wherein electrical signals representing the images upon the sheet of media are generated in response to the sense reflected light to form a digital record or file of the sensed images. In yet another embodiment, image capture component 42 may comprise a camera, a charge coupled device, or other optical sensing device which captures a part of or an entirety of images (text, graphics, pictures, photographs, drawings and the like) upon the sheet of media.

Command interface 45 comprises an interface for image capture system 20 by which externally originating instructions or commands may be provided to processor 48. In one embodiment, command interface and 45 is configured to permit input of commands from a person operating the system 20. For example, in one embodiment, interface 45 may comprise a keyboard, keypad, touchpad, touch screen, mouse, button, switch, slide, lever or microphone with the appropriate voice recognition or speech recognition software. In other embodiments, interface 45 may be configured to permit input of control signals from an external electronic device such as an external computer or from a network or an internet connected to other external electronic devices.

Processor 48 comprises one or more processing units configured to generate control signals directing the operation of actuator 44 and image capture component 42. In the particular embodiment illustrated, processor 48 further generates an electronic image using information from document 24 that is captured by component 42. In one embodiment, processor 48 further controls component 42 to crop portions of the electronic image to remove extraneous information not originating from document 24 or crops such extraneous information after the entire image has been received from component 42. Such cropping is performed using one or more cropping instructions or algorithms stored in memory 46. For example, one embodiment, memory 46 contains instructions for performing fit-to-page and copy algorithms, wherein cropping is provided in such algorithms. As will be described in more detail hereafter, following instructions contained a memory 46, processor 48 performs such cropping while minimizing or eliminating the extent to which cropping is performed based on or to account for tolerances associated with variable positioning of a document backing of lid 32.

For purposes of this application, the term "processing unit" shall mean a presently developed or future developed processing unit that executes sequences of instructions contained in a memory, for example, memory 46. Execution of the sequences of instructions causes the processing unit to perform steps such as generating control signals and processing data. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 48 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 46 comprises a form of persistent storage configured to store and contain instructions for processor 48. Memory 46 is further configured to at least temporarily store digital or electronic files representing images sensed from the one or more sheets of media. In other embodiments, memory 46 may alternatively simply contain instructions for processor 48, wherein captured images are stored on other memory.

Lid 32 comprises an arrangement of components configured to retain or press document 24 against platen 36 during image or information acquisition (such as scanning) by component 42. Lid 32 includes body 60, document backing 62, retainers 64 (schematically illustrated) and bias structures 66A, 66B, 66C and a 66D (collectively referred to as bias structures 66). Body 60 comprises one or more structures configured to support document backing 62, retainers 64 and bias structures 66. As shown in FIG. 1, in the example illustrated, body 60 is configured to rest upon platen frame 38 when lid 32 is closed to inhibit stray or environmental light from passing through platen 36. In other embodiments, platen frame 38 or portions of body 60 may include additional light obstructing or sealing structures.

As shown in FIG. 2, in the particular embodiment illustrated, body 60 is pivotally coupled to bed 30 by hinges 70. As a result, body 60 may be pivoted between an open state shown in FIG. 2 and a closed state shown FIG. 1. In other embodiments, other mechanisms may be used to movably support body 60 and lid 32 relative to bed 30.

Document backing 62 comprises a structure including a substantially planar panel sized and shaped so as to overlie platen 36 when lid 32 is in the closed state. Document backing 62 is further configured to be received within platen frame 38 to further inhibit entry of stray light onto platen 36. Document backing 62 is configured to reflect light originating from capture component 42 back to a sensing device or element associated with capture component 42.

In one embodiment, document backing 62 includes a lower surface 72 which is white. In other embodiments, surface 72 may be colored. In one embodiment, document backing 62 is formed from a compliant and compressible material, permitting backing 62 to compress and apply force to document 24 to retain document 24 in place. In other embodiments, document backing 62 may be formed from a more rigid inflexible material. According to one embodiment, document backing 62 has a length in the Y-axis direction of at least about 11 inches and a width in the X-axis direction of at least about 8.5 inches. In one embodiment, document backing 62 has a length in the Y-axis direction of at least about 14 inches. In other embodiments, document backing 62 may have other dimensions.

Retainers 64 comprise structures configured to movably support document backing 62 relative to body 60 of lid 32. Retainers 64 limit the extent to which document backing 62 may move in a direction perpendicular to a plane 74 which extends along or contains surface 72. In one embodiment, retainers 64 may fix document backing 62 against any movement in a direction perpendicular to a plane 74. In other embodiments, retainers 64 may permit document backing 62 to move to some extent relative to body 60 in a direction perpendicular to plane 74.

Retainers 64 further permit document backing 62 to move in at least one direction substantially parallel to plane 74. In the embodiment illustrated, retainers 64 are configured to permit document backing 62 to move or float in at least two directions substantially parallel to plane 74 and perpendicular to one another. For example, retainers 64 permit document backing 62 to float or move in both the X-axis direction and the Y-axis direction as seen in FIG. 2. In other embodiments, retainers 64 may permit document backing 62 to move in a single direction.

According to one embodiment, retainers 64 may comprise cavities configured to receive tabs or projections extending from document backing 62, wherein such cavities permit limited movement of the received tabs in the X-axis and Y-axis directions. In other embodiments, retainers 64 may comprise tabs or projections received within corresponding cavities provided by document backing 62. In yet another embodiment, document backing 62 may be coupled or secured to body 60 by one or more flexible tethers. In other embodiments, document backing 62 may be movably secured to body 60 in other fashions. Although lid 32 is illustrated as including four spaced retainers 64, in other embodiments, lid 32 may include a greater or fewer of such retainers 64.

Bias structures 66 comprise structures coupled between body 60 and document backing 62 that are configured to resiliently urge document backing 62 in a direction parallel to plane 74. In the particular example illustrated, bias structures 66 are configured to resiliently urge document backing 62 either towards surface 50 or towards surface 52 such that document backing 62 is resiliently urged closer to or into corner 54. As a result, such bias structures 66 more reliably locate document backing 62 against surfaces 50 and 52 to reduce the likelihood of gaps or spaces between document backing 62 and platen frame 38 proximate to corner 54 which might have otherwise occurred because of manufacturing and assembly variability and tolerances. Consequently, the additional cropping of an electronic image which might have been previously performed to ensure that light reflected from such spaces along edges of document 24 were not included in the electronic image may be omitted. Thus, there is also a smaller likelihood of information from document 24 also being cropped.

In the particular example illustrated, bias structures 66A provide a biasing force in the direction indicated by arrows 80 while bias structures 66D provide a biasing force in the direction indicated by arrows 82. Bias structures 66C provide a biasing force in the direction indicated by arrows 84 while bias structures 66B provide a biasing force in the direction indicated by arrows 86. Each pair or set of bias structures 66 (66A, 66B, 66C and 66D) are symmetrically arranged along corresponding side of document backing 62. As a result, biasing forces are applied to document backing 62 in a symmetrical or uniform manner. In other embodiments, lid 32 may alternatively be provided with a greater or fewer of such bias structures 64, such bias structures 64 may be non-symmetrically arranged along sides of document backing 62 or certain bias structures 66 may be configured to apply a greater biasing force as compared to other of bias structures 66.

According to one embodiment, each of bias structures 66 comprises a leaf spring configured to apply a resiliently biasing force in the directions noted. In one embodiment, such leaf springs may be fabricated as separate components and mounted to body 60. In another embodiment, such leaf springs may be integrally formed as part of a single unitary body with body 60. For example, body 60 may be formed from a polymeric material, wherein the leaf springs of bias structures 66 are formed from the same polymeric material, but appropriately dimensioned, sized and configured so as to be resiliently flexible and to serve as a leaf spring. In those embodiments in which bias structures 66 are integrally formed as part of a single unitary body with body 60, the complexity and cost of lid 32 is reduced. In other embodiments, other biasing mechanisms may be employed. Examples of other biasing mechanisms include, but are not limited to, compression springs, coil springs, and blocks or masses of resiliently compressible material such as resiliently compressible foams, polymers and rubber materials.

As illustrated in broken lines in FIG. 2, in some embodiments, bed 30 may additionally include bias structures 90A and 90B (collectively referred to as bias structures 90). Bias structures 90 are similar to bias structures 66 in that bias structures 90 are configured to resiliently urged or bias document backing 62 in a direction parallel to plane 74. In the example illustrated, bias structures 90 are configured to resiliently urge document backing 62 towards surface 52 and towards surface 50 such that document backing 62 is urged into corner 54 of platen frame 38. In particular, bias structures 90A apply a bias force in the direction indicated by arrows 92 while bias structures 90B apply a bias force in the direction indicated by arrows 94 when lid 32 is lowered or closed against bed 30. As with bias structures 66, bias structures 90 are symmetrically arranged along sides of platen frame 38 and apply substantially equal biasing forces (have substantially equal spring constants). As a result, a uniform biasing force is applied to sides of document backing 62. In other embodiments, a greater or fewer of such bias structures 90 may be provided, bias structures 90 may exert different biasing forces and bias structures 90 may be non-symmetrically arranged located along document backing 62 when lid 32 is closed.

According to one embodiment, each of bias structures 90 comprises a structure coupled to housing 34 or platen frame 38 and configured to extend into engagement with document backing 62 when lid 32 is closed. In one embodiment, bias structures 90 may comprise leaf springs. In one embodiment, bias structures 90 may be integrally formed as part of a single unitary body with platen frame 38. In other embodiments, bias structures 90 may have other configurations. For example, bias structures 90 may alternatively comprise other forms of springs or individual masses of resiliently compressible material. In other embodiments, bias structures 90 may be omitted.

In operation, lid 32 is positioned to the open stage shown in FIG. 2. A document 24 is rested upon platen 36 with a corner of the document 24 positioned against surfaces 50 and 52 in corner 54 of platen frame 38. Thereafter, lid 32 is closed. During such closing, edges 96 and 97 of document backing 62 will contact surfaces 50 and 52 of platen frame 38, respectively. In this embodiment, continued lowering of lid 32 urges document backing 62 in directions away from surfaces 50 and 52 and against the biasing forces applied by bias structures 66 and 90. In some embodiments, surfaces 50, 52 and/or surfaces 96 and 97 may be chamfered, sloped, angled or beveled such that downward movement in force of document backing 62 urges document backing 62 in directions parallel to plane 74 and against the biasing forces applied by bias structures 66 and 90. During such movement of document backing 62, bias structures 66 and 90 may be at least partially compressed. Bias structures 66 and 90 continue to apply a biasing forces ensuring that document backing 62 is snug or tightly registered against surfaces 50 and 52.

In response to receiving an image capture command from control interface 45, processor 48 generates control signals directing actuator 44 to move image capture component 42 at least partially across platen 36 while scanning and capturing images or information from face 22 of document 24. During such image capture, electronic signals are transmitted from component 42 to processor 48 which assembles an initial electronic image based upon such signals. In one embodiment, processor 48, following machine-readable instructions stored in memory 46, may control the capture of information by component 42 such that component 42 does not sense selected regions along the edges of platen frame 38 or does not transmit signals representing selected regions along edges of platen 38. In other embodiments, processor 48 may receive signals representing all regions along platen frame 38 but may additionally perform manipulation upon the initial electronic image to crop portions of the electronic image. Such cropping is performed in an attempt to reduce the likelihood that images or information not originating on document 24, such as those resulting from document 24 being skewed with respect to corner 54, are not included in the final electronic image.

The cropping or trimming of scanned information may result in the loss of information from document 24. The potential loss of information is aggravated further by the generation of borderless representations of the captured image. In this process, some of the image may be lost in order to guarantee the borderless representation. In some embodiments this may be the result of the need to compensate for potential overspray when printing. In other embodiments this could be the result of mechanical trimming of the representation. In such instances, further trimming or cropping of the image acts to amplify any initial loss of the original image due to cropping during image acquisition. According to one embodiment, processor 48 may perform a fit-to-page operation or a copy operation pursuant to command instructions received via command interface 45. Pursuant to such algorithms, the electronic image may additionally be resized.

Because bias structures 66 and 90 more reliably register document backing 62 within corner 54, the same corner in which document 24 is registered, the likelihood of gaps or spaces between document backing 62 and platen frame 38 proximate to corner 54 which might have otherwise occurred because of manufacturing and assembly variability and tolerances is reduced. As a result, processor 48 reduces or eliminates any additional cropping of an initially captured electronic image which might have been previously performed to ensure that light reflected from such spaces along edges of document 24 were not included in the electronic image. Thus, there is also a smaller likelihood of information from document 24 also being trimmed or cropped.

In one embodiment in which bias structures 66 were added to resiliently bias a floating or movable document backing 62, rather than a fixed centered document backing, copy algorithm crop values were able to be decreased by approximately 45% to 67%. In one embodiment, top of form and left of form cropping values for a fit-to-page crop were reduced from 6.23 mm and 4.48 mm to 3.05 mm and 1.78 mm, respectively. Top of form and left of form cropping values for a copy crop were reduced from 5.05 mm and 3.95 mm to 1.95 mm and 1.10 mm, respectively. In another embodiment, the addition of bias structures 66 permitted top of form and left of form cropping values of 4.5 mm and 4.0 mm in a fit-to-page crop to be reduced to 3.05 mm and 1.78 mm, respectively. Top of form and left a form cropping values for a copy crop were reduced from 3.0 mm and 2.5 mm to 1.95 mm and 1.10 mm, respectively.

Figure 3:
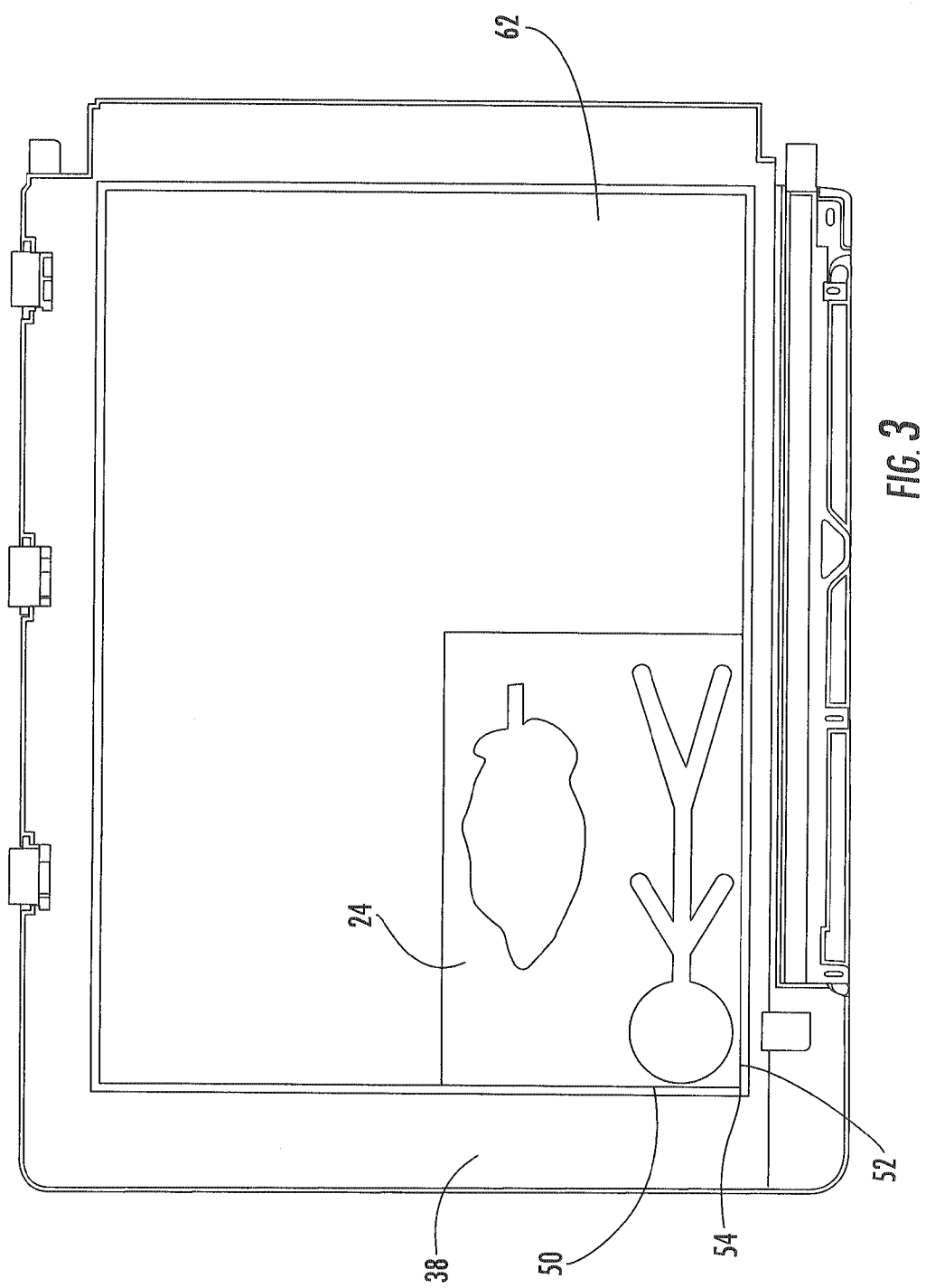
FIG. 3 is a bottom plan view of an image capture bed illustrating captured information from a document according to a first scenario.

FIGS. 3-5 illustrate the enhanced information capture from document 24 in more detail. FIGS. 3-5 illustrate captured information along platen 36 as seen by component 42 with document 24 resting upon platen 38. FIG. 3 illustrates a first circumstance, wherein document 24 is biased perfectly into corner 54 and registered flush against edges or surfaces 50 and 52. In the scenario shown in FIG. 3, lid 32 is closed on top of document 24 and is positioned perfectly against surfaces 50 and 52. As a result, component 42 is able to capture all information from document 24 without cropping and without informing an electronic image having darkened borders between surfaces 50 and 52 and document 24.

FIG. 4 illustrates a second more realistic scenario in which document backing 62 is alternatively mounted in a stationary fashion and centered with respect to the window provided by platen frame 38, allowing document backing 62 to always fit regardless of possible manufacturing variations within specified tolerances. Because document 24 may not always sit perfectly flush in corner 54 or be substantially perfectly square and because gaps may exist between document backing 62 and surfaces 50 and 52 as a result of the centering of document backing 62, relatively large regions adjacent to surfaces 50 and 52 are cropped to ensure that such gaps are never seen. This may result in information from document 24 also being cropped.

FIG. 5 illustrates image capture system 20 in which document backing 62 is resiliently biased into corner 54, reducing any gap between document backing 62 and corner 54 of platen frame 38. As a result, a cropping zone adjacent to surfaces 50 and 52 may be reduced while still preventing or at least substantially reducing the occurrence of gaps being seen in the final electronic image. By reducing the extent of cropping along edges or surfaces 50 and 52, more information may be captured from document 24.

FIGS. 6-14 illustrate image capture system 120, another embodiment of image capture system 20 shown in FIGS. 1 and 2. Image capture system 120 includes image capture bed 30 (shown in FIG. 6) and the lid 132. For ease of illustration, only platen frame 38 of bed 30 is illustrated in FIG. 6. Image capture bed 30 is illustrated and described with respect to FIGS. 1 and 2. In the particular embodiment as shown in FIG. 6, bed 30 omits bias structures 90 (shown in FIG. 2). In other embodiments, bed 30 may additionally include bias structures 90 or may have other configurations.

Figure 14:
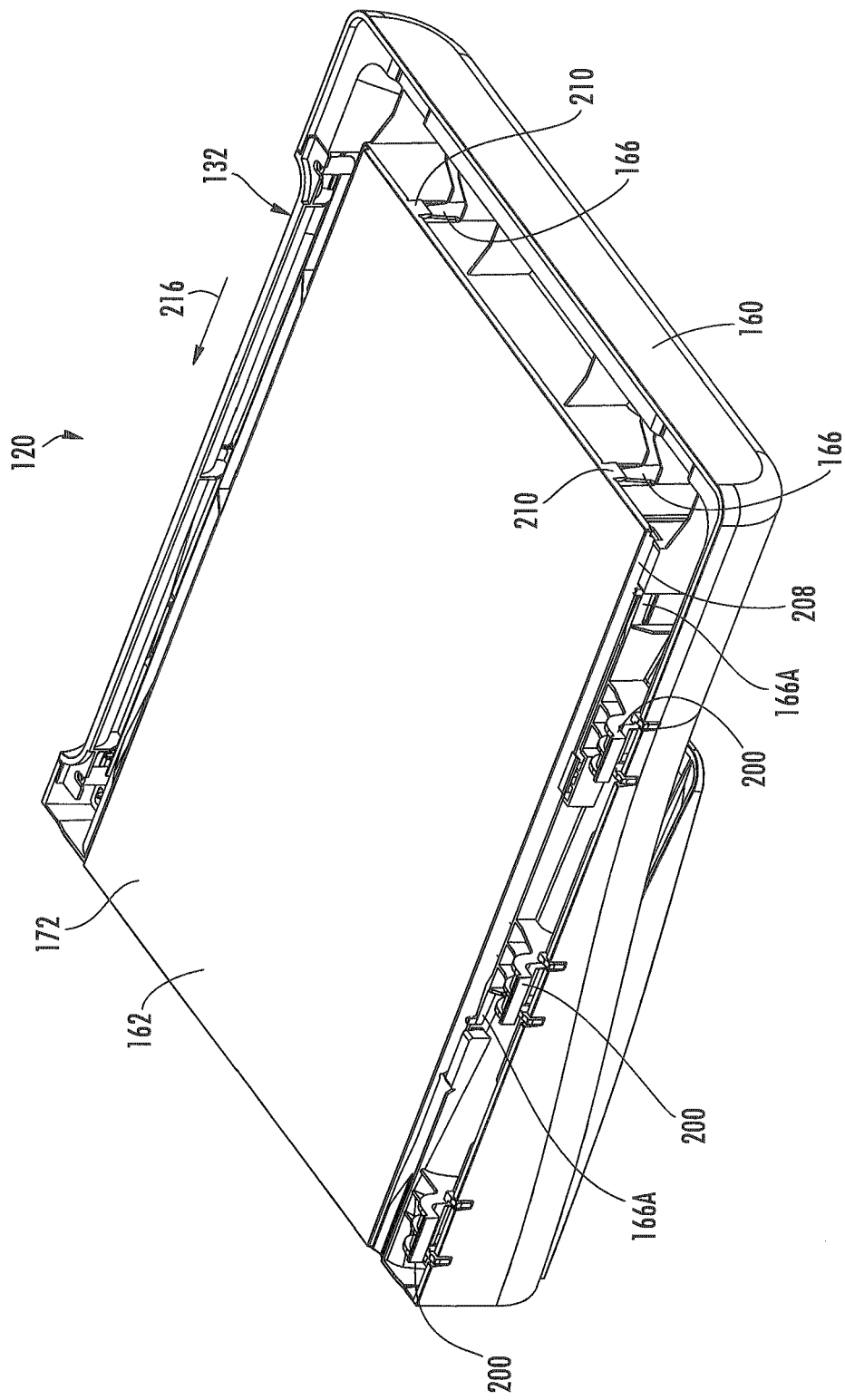
FIG. 14 is a bottom perspective view of the lid of FIG. 7 including a document backing according to an example embodiment.

FIG. 14 illustrates lid 132 separated from bed 30. As shown by FIG. 14, lid 132 includes body 160, document backing 162, retainers 164 (shown in FIG. 6) and bias structures 166A and 166B (collectively referred to as bias structures 166). FIGS. 6-13 illustrate lid 32 omitting document backing 162 for purposes of illustrating body 160, retainers 164 and bias structures 166. As shown by FIGS. 6 and 7, body 160 is an elongate generally planar member formed from one or more structures which are snapped, bonded, welded, or otherwise joined to one another so as to form a cavity or recess 161 into which document backing 162 is partially received. In one embodiment, body 160 is formed from one or more plastic members which are fastened or joined to one another. Body 160 includes internal ribs or frame members which provide body 160 with rigidity while reducing the weight of body 160. Body 160 may have a variety of different configurations other than those illustrated.

As shown by FIG. 6, body 160 includes a plurality of arcuate hooks 200 which are received within corresponding openings 202 in frame 38. Hooks 200 cooperate with openings 202 to form hinges 170 which pivotally connect lid 132 to bed 30. In the example illustrated, hooks 200 are integrally formed as part of a single unitary body with body 160. In other embodiments, hooks 200 may be fastened to body 160. In other embodiments, lid 132 may be joined to bed 30 in other fashions.

As shown by FIG. 14, document backing 162 comprises a generally plate-like or planar structure having a backing surface 172 configured to extend opposite to platen 36 (shown in FIG. 2) and any document captured between surface 172 and platen 36. In one embodiment, surface 172 is white so as to reflect a large portion of the visible spectrum of light. In one embodiment, surface 172 has a sufficient area so as to extend opposite to substantially all of platen 36 that is exposed through frame 38. In addition, surface 172 is configured to be received within the opening of frame 38 when lid 132 is closed against bed 30.

As further shown by FIG. 14, document backing 162 additionally includes surfaces in engagement with retainers 164 and bias structures 166. In particular, document backing 162 includes outwardly extending tabs (not shown) in engagement with retainers 164, side surfaces 208 in engagement with bias structures 166A and tabs 210 in engagement with bias structures 166B. As will be described hereafter, such surfaces retain document backing 162 to body 160 while permitting document backing 162 to be resiliently biased and moved in directions parallel to a plane of surface 172.

As shown by FIG. 6, retainers 164 each generally comprise a plurality of ribs 210 spaced from a bar 212 to form any intermediate cavity 214. Cavity 214 is configured to receive a projection or tab (not shown) extending from document backing 162. Cavity 214 is sized such the tab extending from document backing 162 may slide in two perpendicular directions in a plane parallel to surface 172 of the document backing 162. In the particular embodiment illustrated, lid 132 is illustrated as including four asymmetrically arranged retainers 164. In other embodiments, lid 132 may have a greater or fewer of such retainers 164, retainers 154 may be provided in other locations or retainers 164 may have other configurations.

As shown by FIGS. 6-10, bias structures 166A comprise leaf springs integrally molded as a single unitary body with an adjacent portion of body 160. As shown by FIG. 14, structures 166A generally extend parallel to surfaces 208 of document backing 162 on an exterior of surfaces 208 in the Y-axis direction as seen in FIG. 7. As a result, bias structures 166A are compact with respect to a remainder of body 160, permitting body 160 to occupy a smaller volume. Structures 166A are formed so as to engage surfaces 208 prior to insertion of document backing 162 into frame 38 to provide a preload force. In other embodiments, bias structures 166A may be configured to be initially out of engagement with surfaces 208 of document backing 162, wherein document backing 162 engages and compresses bias structures 166A upon insertion into frame 38.

As shown by FIGS. 6-7, and 11-14, bias structures 166B comprise tabs extending from body 160 in a direction generally perpendicular to surface 172 of document backing 162. Bias structures 166 are configured so as to engage tabs 210 of document backing 162. Tabs 166 are further configured to resiliently deflect or bend in response to receiving force from document backing 162. Upon movement of document backing 162 in a direction indicated by arrow 216, bias structures 166B deflect while applying a bias force tending to urge document backing 162 in a direction opposite to that indicated by arrow 216.

In the particular embodiment illustrated, bias structures 166 are integrally formed as part of a single unitary body with an adjacent portion of body 160. In one embodiment, bias structures 166B are formed from the same polymeric material as that from which body 160 is formed. As a result, bias structures 166B may be inexpensively provided and occupy relatively little space, allowing lid 132 to be compact and inexpensive.

Although lid 132 is illustrated as including two bias structures 166B symmetrically arranged on one side of document backing 162, in another embodiment, lid 132 may have a greater or fewer of such bias structures 166B. In addition, such bias structures 166B may be provided at other locations along document backing 162. In still other embodiments, bias structures 166B may be configured similarly to bias structures 166A or bias structures 166A may be configured similarly to bias structures 166B.

Like image capture system 20, image capture system 120 registers document backing 162 in corner 54 of frame 38 to reduce the likelihood of gaps or spacings between document backing 62 and platen frame 38 proximate to corner 54 which might have otherwise occurred because of manufacturing and assembly variability and tolerances. As a result, processor 48 (shown in FIG. 1) reduces or eliminates additional cropping of an initially captured electronic image which might have been previously performed to ensure that light reflected from such spacings along edges of document 24 (shown in FIG. 1) were not included in the electronic image. Thus, there is also a smaller likelihood of information from document 24 also being cropped.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a flatbed image capture lid comprising a movable document backing having a flat planar surface that is resiliently biased in a first direction substantially parallel to the surface.

2. The apparatus of claim 1, wherein the backing is resiliently biased in the first direction parallel to the surface and a second direction parallel to the surface and perpendicular to the first direction.

3. The apparatus of claim 1, wherein the lid further comprises:
a body; and
a first bias structure coupled between the body and the document backing.

4. The apparatus of claim 3, wherein the first bias structure is integrally formed as a single unitary body with the body.

5. The apparatus of claim 3, further comprising a second bias structure spaced from the first bias structure and coupled between the body and the document backing, wherein the second bias structure resiliently biases the document backing in a second direction substantially parallel to the plane and perpendicular to the first direction.

6. The apparatus of claim 3, wherein the bias structure comprises a leaf spring.

7. The apparatus of claim 6, wherein the leaf spring is integrally formed as a single unitary body with the body.

8. The apparatus of claim 1 further comprising:
a transparent platen;
a first bias projecting above a platen configured to apply a first bias force in a second direction; and a second bias projecting above the platen configured to apply a second bias force perpendicular to the first bias force, wherein the backing is resiliently biased against the first bias and the second bias.

9. The apparatus of claim 8, wherein the lid is hinged relative to the platen.

10. The apparatus of claim 8 further comprising a image capture movable across the platen and configured to generate signals representing a scanned electronic image; and
   a processing unit configured to receive the scans electronic image and to crop the scanned electronic image to form a cropped image.

11. The apparatus of claim 10, wherein the processing unit is configured to apply a processing algorithm to the cropped image.

12. The apparatus of claim 11, wherein the processing algorithm is selected from a group of processing algorithms consisting of: fit-to-page and copy scan algorithms.

13. The apparatus of claim 10, wherein an extent to which the scanned image is cropped omits any extent based on tolerances for variable positioning of the backing.

14. The apparatus of claim 1, wherein the flat planar surface of the movable document backing extends over a majority of the lid.

15. The apparatus of claim 1, wherein the movable document backing comprises a flat panel providing the surface and wherein the surface has a first dimension of at least 11 inches in a second dimension of at least 8.5 inches.

16. The apparatus of claim 1 further comprising a spring resiliently biasing the flat planar surface in the first direction.

17. A method comprising:
   resiliently biasing flat planar surface of a document backing flat planar panel in a first direction substantially parallel to the surface.

18. The method of claim 17 further comprising resiliently biasing the document backing in a second direction substantially parallel to the surface and perpendicular to the first direction.

19. The method of claim 18, wherein the document backing is resiliently biased against first and second perpendicular surfaces projecting above a transparent platen.

20. The method of claim 17, wherein the document backing is movably supported by a body of a flatbed image capture lid and wherein the document backing is resiliently biased by a bias structure coupled between the body and the document backing.

21. The method of claim 17 further comprising:
   capturing an image of a document positioned against the document backing to form an electronic image; and
   cropping the electronic image, wherein an extent to which the electronic image is cropped omits any extent based on tolerances for variable positioning of the backing in the first direction.

22. The method of claim 21, wherein the document backing is resiliently biased in a second direction parallel to the surface and perpendicular to the first direction and wherein an extent to which the electronic image is cropped omits any extent based on tolerances for variable positioning of the backing in the second direction.

23. An apparatus comprising:
   a flatbed image capture lid comprising:
   a movable document backing extending in a plane and resiliently biased in a first direction substantially parallel to the plane;
   a body; and
   a first bias structure coupled between the body and the document backing, wherein the first bias structure comprises a spring.

24. The apparatus of claim 23, wherein the spring comprises a leaf spring.

25. The apparatus of claim 24, wherein the leaf spring is integrally formed as a single unitary body with the body.

26. An apparatus comprising:
   a flatbed image capture lid comprising:
   a movable document backing extending in a plane and resiliently biased in a first direction substantially parallel to the plane;
   a transparent platen;
   a first bias projecting above a platen configured to apply a first bias force in a second direction; and
   a second bias projecting above the platen configured to apply a second bias force perpendicular to the first bias force, wherein the backing is resiliently biased against the first bias and the second bias.

27. The apparatus of claim 26 further comprising a image capture movable across the platen and configured to generate signals representing a scanned electronic image; and
   a processing unit configured to receive the scans electronic image and to crop the scanned electronic image to form a cropped image.

28. The apparatus of claim 27, wherein the processing unit is configured to apply a processing algorithm to the cropped image.

29. The apparatus of claim 28, wherein the processing algorithm is selected from a group of processing algorithms consisting of: fit-to-page and copy scan algorithms.

30. The apparatus of claim 27, wherein an extent to which the scanned image is cropped omits any extent based on tolerances for variable positioning of the backing.

* * * * *